United States Patent [19]

Fitch

[11] 4,200,413
[45] Apr. 29, 1980

[54] PIPELINING PARTICULATE SOLID MATERIAL AS STABLE FOAM SLURRY

[75] Inventor: John L. Fitch, Dallas, Tex.

[73] Assignee: Mobil Oil Corporation, New York, N.Y.

[21] Appl. No.: 851,001

[22] Filed: Nov. 14, 1977

[51] Int. Cl.² ............................................. B65G 53/30
[52] U.S. Cl. ........................................ 406/49; 406/46; 406/47
[58] Field of Search ............................ 302/14, 15, 66; 252/8.55 R, 8.55 C; 299/3, 5, 18; 166/280, 305 R, 307, 308; 406/46, 47, 49, 117, 118, 119, 120, 197

[56] References Cited

U.S. PATENT DOCUMENTS

| | | | |
|---|---|---|---|
| 2,672,370 | 3/1954 | Jones et al. | 302/14 |
| 3,180,691 | 4/1965 | Wunsch et al. | 302/66 |
| 3,617,095 | 11/1971 | Lissant | 302/66 |
| 3,637,263 | 1/1972 | Wasp | 302/66 |
| 3,934,651 | 1/1976 | Nierode et al. | 166/308 X |
| 3,937,283 | 2/1976 | Blauer et al. | 166/307 |
| 3,950,034 | 4/1976 | Dreher et al. | 302/66 |
| 3,980,136 | 9/1976 | Plummer et al. | 166/280 |

OTHER PUBLICATIONS

"Formation Fracturing with Foam", R. E. Blauer, C. A. Kohlhaas, Paper No. SPE 5003, Society of Petroleum Engineers of AIME, Dallas, Texas, Oct. 1974.
"Determination of Laminar, Turbulent, and Transitional Foam Flow Losses in Pipes", R. E. Blauer, B. J. Mitchell, C. A. Kohlhaas, Paper No. SPE 4885, Society of Petroleum Engineers of AIME, Dallas, Texas, Apr. 1974.

Primary Examiner—James L. Rowland
Attorney, Agent, or Firm—C. A. Huggett; Henry L. Ehrlich

[57] ABSTRACT

A method of transporting particulate solid material through a pipeline in the form of a stable foam slurry. There is formed a pumpable slurry of the particulate solid material in a stable foam carrier medium and the slurry is flowed through the pipeline to a receiving point.

4 Claims, 1 Drawing Figure

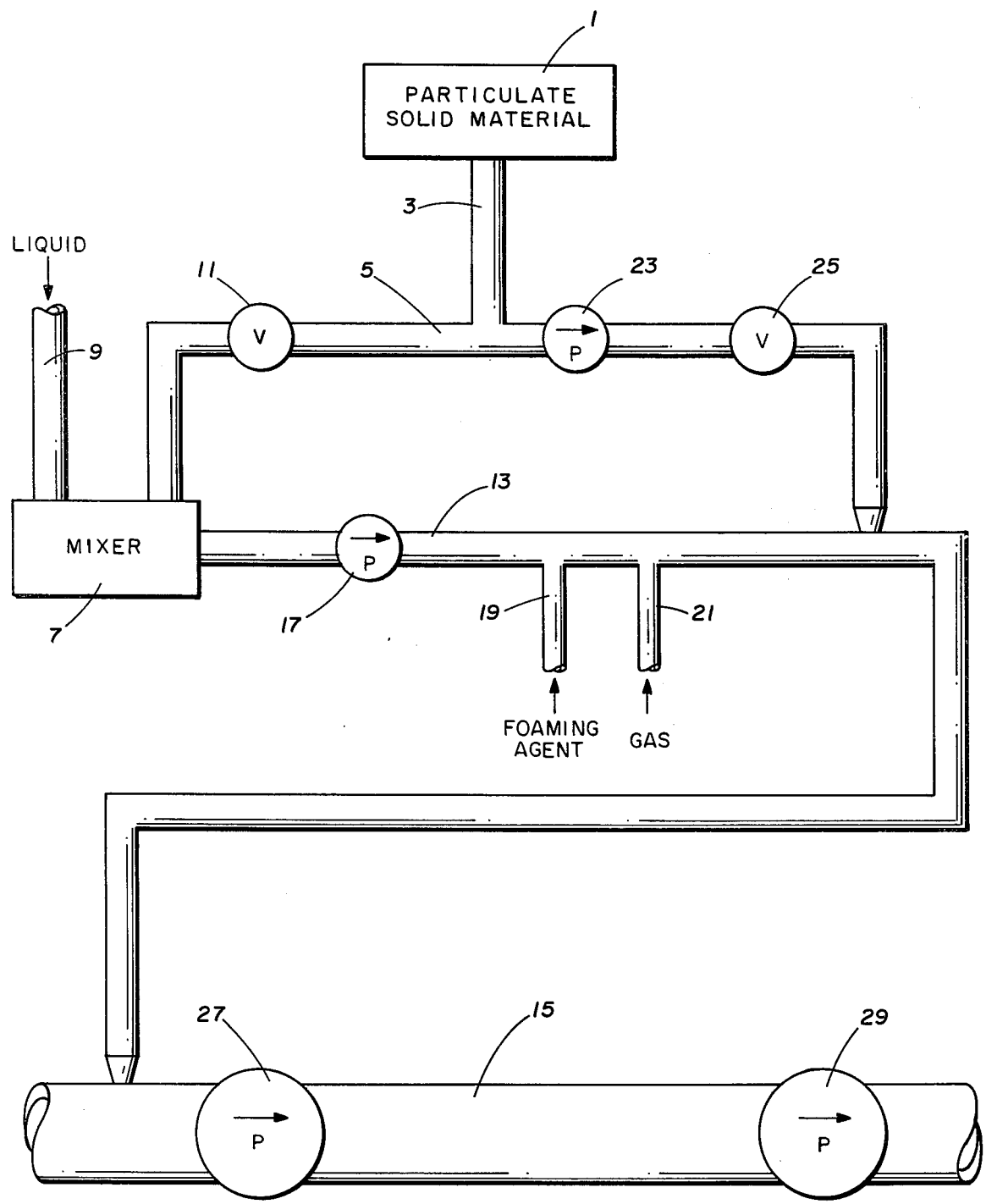

PIPELINING PARTICULATE SOLID MATERIAL AS STABLE FOAM SLURRY

BACKGROUND OF THE INVENTION

This invention is concerned with the transportation of particulate solid material through a pipeline and in particular is concerned with the transportation of coal as a slurry in a stable foam carrier medium.

Large reserves of coal are known to exist in this country as well as others in regions which are remote from highly populated and industrialized centers where it is desirable to utilize the coal as fuels. Many of these remote areas where the coal reserves are located are also arid regions where water is scarce. Various methods including pipelining the coal in the form of slurries have been described for transporting coal to areas of intended use.

One of the major problems which has been recognized in the transporting of coal as slurries is that of maintaining the coal in suspension in the carrier liquid of the slurry.

In U.S. Pat. No. 2,672,370 there is described a method of transporting subdivided solids such as coal suspended in a liquid medium such as water through long distance pipelines and an improved pipeline system. In U.S. Pat. No. 3,617,095 there is described a process of transferring bulk solids through a pipeline by pumping the solids suspended in a pseudo-plastic fluid exhibiting nonNewtonian viscosity properties, as exemplified by thixotropic emulsions. In U.S. Pat. No. 3,637,263 coal is transported through a pipeline in a form of an aqueous slurry made up of a mixture of particulate coal and an inorganic finely divided water insoluble solid carrier having a specific gravity of at least 1.6. In U.S. Pat. No. 3,950,034 there is described a method of pipelining solids by suspending the solids in a liquid containing lamellar micelles and pumping the mixture at flow rates predetermined to produce retroviscous behavior in the liquid at noncryogenic temperatures.

SUMMARY OF THE INVENTION

This invention is directed to a method of transporting particulate solid materials through a pipeline wherein a pumpable slurry is formed of the particulate solid material in a stable foam carrier medium. The particulate solid material is present in the stable foam in an amount of at least 20 percent by volume based on the total volume of the stable foam slurry and the pumpable slurry is flowed through the pipeline.

BRIEF DESCRIPTION OF THE DRAWING

The drawing is a schematic view illustrating a method of forming a pumpable stable foam slurry containing particulate solid material and transporting the solid material through a pipeline.

DESCRIPTION OF THE PREFERRED EMBODIMENTS

This invention is concerned with a method of transporting particulate solid material through a pipeline in the form of a stable foam slurry. The particulate solid material may be, for example, particulate coal particles, other forms of particulate carbonaceous material, such as coke, lignite and pitch, ores, and still other particulate material which is essentially insoluble in the stable foam used as a carrier medium. For convenience hereafter, this invention will be described primarily with regard to transporting coal in the form of a pumpable stable foam slurry but it is to be understood that other particulate solid material may equally well be so transported.

In accordance with this invention, particulate coal is transported by being flowed through a pipeline in the form of a pumpable stable foam slurry. The stable foam which serves as a carrier medium for the particulate coal may be formed from a liquid, usually water, gas, and a foam stabilizing agent, such as a soap or a surfactant.

This invention provides a method of transporting a larger volume of coal per unit volume of water by using a stable aqueous foam carrier medium than is possible when transporting coal as a slurry in an aqueous liquid carrier medium. Thus, this invention provides for the conservation of water in the transportation of coal as a slurry through a pipeline. In addition, this invention provides for the conservation of energy in the transporting of coal in that the pumpable foam slurry of this invention offers less friction in flowing through a pipeline than does a liquid coal slurry and thus consumes less energy through friction losses.

Stable foams of the type described for use as wellbore clean-out and drilling fluids and fluid loss, diverting, and fracturing fluids are satisfactory for use as the carrying medium of the stable foam slurry of this invention. Examples of such satisfactory foams and properties and uses thereof are found in Paper No. SPE 4885, "Determination of Laminar, Turbulent, and Transitional Foam Flow Losses in Pipes" by R. E. Blauer, B. J. Mitchell, and C. A. Kohlhaas, prepared for presentation at the 44th Annual California Regional Meeting of the Society of Petroleum Engineers of AIME held in San Francisco, California, Apr. 4–5, 1975; Paper No. SPE 5003, "Formation Fracturing With Foam" by R. E. Blauer and C. A. Kohlhaas, prepared for presentation at the 49th Annual Fall Meeting of the Society of Petroleum Engineers of AIME held in Houston, Texas, Oct. 6–9, 1974; U.S. Pat. No. 3,937,283 to Roland E. Blauer et al; and U.S. Pat. No. 3,980,136 to Roy A. Plummer et al.

In SPE Paper No. 5503, it is said that foams are dispersions of gas in a liquid with a small amount of surfactant foaming agent added. The volumetric gas content referred to as foam quality is generally between 65% and 85%. In SPE Paper No. 4885 foam quality is defined as the ratio of gas volume to total foam volume:

$$\tau_{T,P} = (V_{sg}/V_f)$$

where:

$\tau_{T,P}$ = foam quality at specified temperature and pressure, $V_{sg}$ = volume of saturated gas, ft$^3$, and $V_f$ = volume of foam, ft$^3$. Since the gas is compressible, temperature and pressure of the foam must be specified. In the Blauer et al patent the foam quality defined in SPE Paper 4885 is referred to as "Mitchell quality". The foam used by Blauer et al for fracturing subterranean formations has a Mitchell quality in the range of between 0.5236 to 0.9999 and preferably within the range of 0.60 to 0.85 at the temperature and pressure conditions existing during treatment of the formation.

In accordance with the present invention, there is provided a method of transporting particulate solid material, such as coal, through a pipeline wherein there is formed a pumpable slurry of the particulate solid material in a stable foam carrier medium. The particulate solid material is introduced into the stable foam in an amount of at least 20 percent by volume based on the total volume of the stable foam slurry and preferably in an amount of at least 40 percent and up to the maximum amount that can be held by the foam without any substantial solidification thereof which maximum amount is on the order of about 55 percent. The pumpable slurry is then flowed through the pipeline to a designated receiving point.

With reference to the drawing, a more detailed description of this invention and embodiments thereof is given. There, a source 1 of particulate material such as particulate coal is shown connecting via a conduit 3 with a conduit 5 which connects at one end thereof with a mixer 7. A conduit 9 for conducting liquid, such as water therethrough, also connects with the mixer 7. The source 1 in the drawing schematically represents a source of particulate solid material and may be, for example, a hopper or other means for feeding particulate solid material into the conduit 5. The mixer 7 may be a tank where the particulate solid material and liquid are blended together or may contain means for mixing and blending the particulate solid material with the liquid (not shown). Examples of such means include liquid jets and mechanical stirrers. A valve 11 is located in the conduit 5 intermediate the intersection of conduit 3 with that of conduit 5 and the mixer 7 for controlling the amount of flow of particulate solid material into the mixer. A conduit 13 is shown leading from the mixer 7 and connecting with a pipeline 15. A pump 17 is located in the conduit 13 for pumping the liquid mixture or slurry of particulate solid material from the mixer 7 to the pipeline 15. A conduit 19 for flowing a foaming agent into the conduit 13 is shown connecting therewith downstream of the pump 17. A conduit 21 for flowing a gas into the conduit 13 is shown connecting therewith downstream of the connection point of the conduit 19 with that of the conduit 13. The conduit 5 extends from the intersection with conduit 3 and connects with the conduit 13 at a point downstream of the connection point of the conduit 21 with that of the conduit 13. Located in this portion of the conduit 5 is a pump 23 and a valve 25. In the pipeline 15 there is shown a pump 27 and a pump 29 located downstream thereof.

In the practice of this invention it is desirable to use a foam having a Mitchell quality of at least 0.5236 and preferably of about 0.60 to about 0.85 or up to about 0.99 at the temperature and pressure of the pipeline. In such a foam the deformation characteristic provides a rigidity and increased surface area that enables increased amounts of particulate solid material to be carried by the foam over that which could be carried by lower quality foam.

In the forming of the stable foam slurry of particulate solid material, a first portion of the particulate solid material is flowed through the conduit 5 and valve 11 into the mixer and there blended with liquid to form a liquid slurry having a solids content up to about 50 percent by volume based upon the liquid. This liquid slurry is conveyed by pump 17 through the pipeline 13 and a foaming agent, such as a surfactant or soap, is flowed through the conduit 19 and into the conduit 13 where it is mixed with the liquid slurry. The foaming agent is flowed into the conduit 13 in a sufficient amount to stabilize the foam to be subsequently generated by the introduction of gas into the conduit 13. Gas is introduced under pressure via the conduit 21 into the conduit 13 downstream of the connection therewith of the conduit 19 in a sufficient amount to form a stable foam. Thereafter a second portion of the particulate solid material is flowed through the conduit 5, pump 23, and valve 25 and into the conduit 13 downstream of the connection therewith of the conduit 21 where it is introduced into the stable foam flowing in the conduit 13. The amount of this second portion of particulate solid material is sufficient to raise the total amount of the particulate solid material in the stable foam up to an amount within the range of about 20 to 55 percent by volume based upon the total volume of the stable foam slurry. In forming the liquid slurry in the mixer 7, no more than about 50 volume percent particulate material based on carrier liquid can be mixed in the carrier liquid and maintained suspended therein. After forming the stable foam from this liquid slurry, however, further particulate material may be added to the foam to bring the volume percent of particulate material based on the total volume foam slurry up to about 55 percent.

The foam in the conduit 13 is formed at a pressure sufficient for use in the pipeline 15 at the desired operating pressure and temperature thereof. The pump 17 is operated to produce foam of a quality desirably of at least about 0.60 and at a pressure sufficiently high that it may be injected into the pipeline 15. Pump 27 is then operated to flow the foam through the pipeline 15. Pump 29 is spaced downstream of pump 27 at a location such that the operating pressure is maintained in the pipeline 15 such that the quality of the foam therein is maintained within the range of 0.52 to 0.95 and desirably within the range of 0.60 to 0.85.

The size of the particulate solid material or coal particles which are introduced into the stable foam should vary within the range of about No. 100 to No. 325 U.S.A. Standard Testing Sieve mesh, that is, will pass through a No. 100 mesh sieve and be retained on a No. 325 mesh sieve. The amount of the particulate solid which is introduced into the stable foam and which may be carried thereby varies within the range of about 20 to 55 percent by volume based upon the total volume of the foam slurry.

The preferred base liquid for forming the stable foam is water which is preferred because of its low cost, ready availability, and its tendency to form stable foams with a variety of foaming agents. Other liquids may be used in forming the foam which include methanol or methanol-water mixtures.

The foaming agent used to form the foam is selected from the group consisting of surfactants and soaps and is normally used within the range of about 0.01 to 1.0 weight percent based upon the weight of liquid in the foam. Examples of suitable foaming agents for use in forming foams of aqueous liquids are sodium soaps, anionic surfactants, and nonionic surfactants. Foam stabilizers, such as high molecular weight organic materials or clays, may be also included in the liquid.

Any available gas may be used in forming the foam, though hydrocarbon gases are preferred because of availability. Hydrocarbon gases are frequently available at sites where coal is mined. The gases may be recovered from the stable foam at the termination point of the pipeline, if so desired. Other suitable gases which may be used include nitrogen and carbon dioxide. The water, foaming agents, and foam stabilizers may be separated and recovered at the termination point of the pipeline as well as the gases, if so desired.

What is claimed is:

1. A method of transporting particulate solid material through a pipeline, comprising:
   (a) mixing a first portion of said particulate solid material with an aqueous liquid to form a liquid slurry thereof;
   (b) pumping said liquid slurry though a first conduit;
   (c) injecting into said first conduit at a first injection point and into said liquid slurry a foaming agent selected from the group consisting of surfactants and soaps;
   (d) injecting into said first conduit at a second injection point downstream of said first injection point and into said liquid slurry a gas in an amount sufficient to form a pumpable stable foam slurry;
   (e) injecting a second portion of said particulate solid material into said first conduit downstream of said second injection point and into said pumpable stable foam slurry; and
   (f) pumping said pumpable stable foam slurry containing said particulate solid material through said pipeline.

2. The method of claim 1 wherein in step (c) gas is injected into said first conduit in an amount sufficient to form a pumpable stable foam slurry of a quality of at least 52 percent, and wherein in step (f) said pumpable stable foam slurry is pumped through said pipeline at a pressure sufficient to maintain said pumpable stable foam slurry at a quality of at least 52 percent.

3. The method of claim 2 wherein said particulate solid material is coal of a size within the range of about 100 to 325 mesh.

4. The method of claim 3 wherein said coal is present in said stable foam slurry in an amount within the range of about 20 to 55 volume percent based on the volume of said stable foam slurry.

* * * * *

UNITED STATES PATENT AND TRADEMARK OFFICE
CERTIFICATE OF CORRECTION

PATENT NO. : 4,200,413
DATED : April 29, 1980
INVENTOR(S) : John L. Fitch

It is certified that error appears in the above-identified patent and that said Letters Patent are hereby corrected as shown below:

Column 2, line 36, "1975" should read --1974--.
Column 2, line 43, "5503" should read --5003--. Column 2, line 50, "($V_{sg}/V_f$)" should read --$V_{sg}/V_f$--.

Signed and Sealed this

Nineteenth Day of August 1980

[SEAL]

Attest:

SIDNEY A. DIAMOND

Attesting Officer  Commissioner of Patents and Trademarks